United States Patent
Braun

(10) Patent No.: US 8,628,271 B2
(45) Date of Patent: Jan. 14, 2014

(54) ROAD PAVER

(75) Inventor: Arthur Braun, Deidesheim (DE)

(73) Assignee: Joseph Voegele AG, Mannheim (DE)

( * ) Notice: Subject to any disclaimer, the term of this patent is extended or adjusted under 35 U.S.C. 154(b) by 467 days.

(21) Appl. No.: 12/722,488

(22) Filed: Mar. 11, 2010

(65) Prior Publication Data

US 2010/0296868 A1    Nov. 25, 2010

(30) Foreign Application Priority Data

May 25, 2009  (EP) .................................. 09006977

(51) Int. Cl.
  *E01C 19/22*  (2006.01)
  *E01C 19/18*  (2006.01)

(52) U.S. Cl.
  USPC .......................................... 404/118; 404/110

(58) Field of Classification Search
  USPC ........ 404/101, 118, 119; 180/53.6, 53.7, 53.8
  See application file for complete search history.

(56) References Cited

U.S. PATENT DOCUMENTS

| | | | | |
|---|---|---|---|---|
| 2,382,096 | A * | 8/1945 | Pierce ........................... | 404/115 |
| 2,660,892 | A * | 12/1953 | Ross ............................. | 74/15.63 |
| 2,911,892 | A * | 11/1959 | Pollitz ......................... | 404/84.05 |
| 3,055,280 | A * | 9/1962 | Neville .......................... | 404/95 |
| 3,453,939 | A * | 7/1969 | Fairchild et al. ........... | 404/84.05 |
| 3,665,821 | A * | 5/1972 | Walker ........................... | 404/98 |
| 6,668,953 | B1 * | 12/2003 | Reik et al. ..................... | 180/53.8 |
| 7,220,079 | B2 * | 5/2007 | Lee et al. ....................... | 404/101 |
| 2003/0094317 | A1 * | 5/2003 | Takizawa et al. ............ | 180/53.8 |
| 2003/0113166 | A1 * | 6/2003 | Heims ........................... | 404/118 |
| 2004/0232702 | A1 * | 11/2004 | He ................................. | 290/31 |
| 2005/0074284 | A1 * | 4/2005 | Lee et al. ....................... | 404/108 |
| 2006/0196463 | A1 * | 9/2006 | Pallett et al. ................ | 123/192.1 |
| 2010/0137090 | A1 * | 6/2010 | Holmes ........................... | 475/5 |

FOREIGN PATENT DOCUMENTS

| | | |
|---|---|---|
| DE | 3536247 | 4/1987 |
| DE | 9308801.9 | 9/1993 |
| DE | 20001039 | 3/2000 |
| DE | 10300745 | 7/2004 |
| DE | 102004005673 | 8/2005 |
| DE | 102007019156 | 10/2008 |
| EP | 0489969 | 6/1992 |
| EP | 1118714 | 7/2001 |
| JP | 2005307941 | 11/2005 |
| JP | 2006136072 | 5/2006 |

* cited by examiner

*Primary Examiner* — Thomas B Will
*Assistant Examiner* — Abigail A Risic
(74) *Attorney, Agent, or Firm* — Fish & Richardson P.C.

(57) ABSTRACT

A road paver F having a primary driving aggregate P with a combustion engine M, particularly a diesel engine, the crankshaft 22 of which extends to a power output region within a casing 20 of a clutch and/or a flywheel. A generator R is driven by the primary driving aggregate P at least for supplying electric heating devices H of the road paver F with electric power. A distribution gear mechanism 30 for pumps is mounted to the primary driving aggregate P. The generator R being a generator with permanent magnet excitation is mounted to or into or in lieu of the casing 20. A drive train 29 connected or connectable to the power output region of the crankshaft 22 extends to the distribution gear mechanism 30 for pumps and through the generator R.

15 Claims, 4 Drawing Sheets

ROAD PAVER

Figure 1:
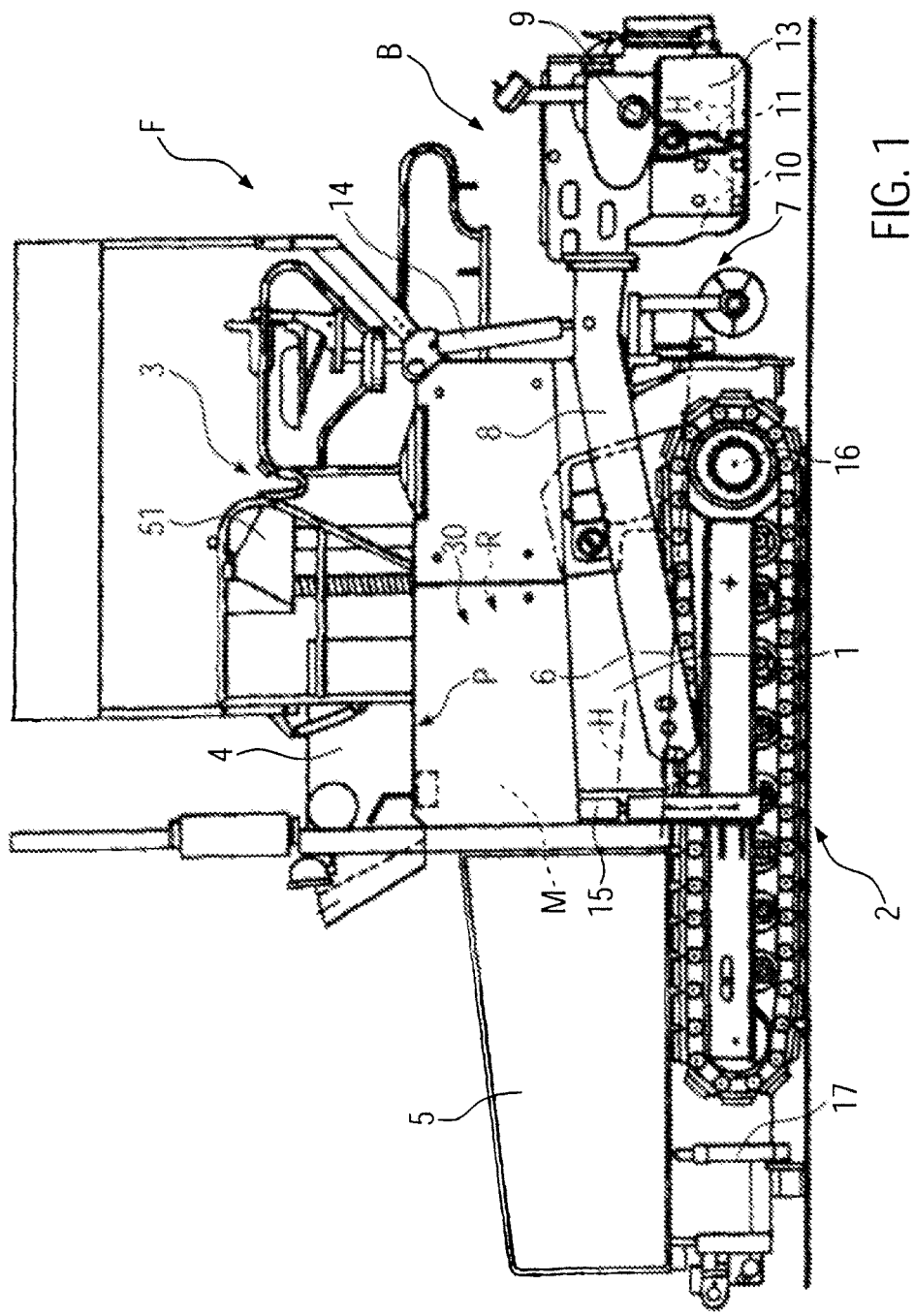

This invention relates to a road paver having a high power generator installed in a space saving manner.

Conventionally, road pavers comprise heating assemblies, e.g. in the paving screed, the heating devices consuming, at least temporarily, a great deal electric power which has to be supplied by the generator. A concept of installing the generator in the road paver has become standardised according to which the generator is located at the end of a driving train connected to the power output region of the crankshaft. Owing to the high power demand the generator has to be large and heavy and needs considerable mounting space. The drive connection of the generator with the primary driving source is complicated as the primary driving source has to drive besides the generator, e.g. via distribution gear mechanism for pumps, a plurality of other secondary drives or functional structural units or the hydraulic pumps of secondary drives or functional structural units. When the generator is placed either at or separate from the distribution gear mechanism for pumps and e.g. is driven via a belt drive from the crankshaft or the distribution gear mechanism for pumps, undesirable lateral loads are produced at an output shaft of the distribution gear mechanism for pump or at the crankshaft of the combustion engine (EP 1 118 714 A). At least one gear stage between the crankshaft or a drive train connected with the crankshaft and the generator has among others the purpose to drive the generator independent from e.g. the nominal speed of the combustion engine with a speed optimised for power output. Due to increasing electric power demands at the road paver the generator conventionally placed at the end of a drive train frequently reaches its power supplying limit such that in some cases even several generators are needed which consume even more mounting space, increase the road paver height, and complicate the arrangement in the road paver. Generally, known concepts do not allow to arrange the generator in a space-saving fashion and to drive the generator with optimum speed (with optimum relative speed between the stator and the rotor). An important aspect of increasingly larger and more powerful generators is furthermore a high starting load and high power input when supplying nominal electric power which both have to be covered either directly by the primary drive aggregate or via several intermediately arranged transmissions constituting several sources of losses. The starting load of the generator hinders starting the primary drive aggregate particularly in case of unfavourable meteorological conditions. The drag power of the generator even without significant consumption of electric power markedly reduces the output power of the primary driving aggregate which e.g. when needed to achieve a high transport speed of the road paver. The power output of the generator also may be unsatisfactory or limited when the generator as one functional unit has to share a relatively complicated power branching distribution gear mechanism for pumps with other functional units.

The diesel engine laterally mounted in the chassis of the road paver known from EP 0 489 969 A drives a rotary generator either directly or via a gear mechanism. The generator is flanged to the diesel engine and supplies the biggest part of the functional units with electric power which functional units in this road paver are electrically driven. The rotary current generator and associated control systems even have larger and longer dimensions than the diesel engine, are heavy and consume a lot of mounting space in the chassis. If further functional units are actuated hydraulically these functional units are connected to a side drive branching off from a gear mechanism being arranged between the power output region of the crankshaft and the rotary current generator.

Combustion engines used in road pavers frequently are equipped with a relatively overhanging casing containing a flywheel or a clutch. The casing e.g. may be standardised according to SAE regulations and may be an integral or mounted part of the engine block which part is available on the market for fair costs. Such standardised casings for the clutch and/or the flywheel usually keep an annular free space between the optionally provided electric rotary clutch on the flywheel and the inner wall of the casing which annular space has not been used until now.

It is object of the invention to provide a road paver which is characterised by a generator which has high output capacity and can be installed in the road paver in space-saving fashion.

Mounting or introducing the generator at or into the casing for the flywheel and/or clutch or in lieu of the casing, i.e. in a mounting space which usually or largely is not used saves considerable space for arranging the generator. The primary driving aggregate then will not, or not significantly, be extended by of the generator. The generator thus arranged compactly also covers high electric power demands as it can be a driven with high and/or optimum relative speed between the rotor and the stator.

Thus, the generator is arranged with a view to low losses directly at the source of the engine power. The drive train which is connected or can be connected to the power output region of the crankshaft penetrates the rotor of the generator and extends through the generator to the distribution gear mechanism for pumps and thus also uses space which is either available or provided in the interior of the generator. Functional groups or pumps of functional groups connected to the drive train can be driven via optimum gear stages and/or power branches independently from the generator positioned upstream.

Hybrid drive systems for construction machines are known in which hybrid drive systems a combustion engine is combined with a generator/electric motor for relieving the environment by mainly saving fuel. The generator/electric motor assists the combustion engine with additional output power or temporarily charges the battery. In this case, however, the general generator/electric motor does not serve to directly supply further equipment parts of vehicle components of which in some operative situations need high electric power, but for this additional purpose usually an electric generator or electric dynamo is provided which is separately driven by the combustion engine (DEMTECH AG, CH-6331 Hünenberg CH, www.demtech-ch/de-hybriddrive-htm).

Particularly expediently the generator is a ring generator with permanent magnet excitation and a hollow ring rotor allowing to extend the drive train through the ring generator to the distribution gear mechanism for pumps. The ring generator is compact, is above all relatively short in axial direction, and has high power capacity as the relative speed between the ring rotor and a stator ring according to this construction principle is high. In the intermediate space between the combustion engine and the distribution gear mechanism for pumps a substantial amount of space is available also in the direction of the diameter which space can be used for arranging windings and/or control devices of the ring generator.

In an expedient embodiment the rotor of the generator is driven with a speed different from the speed of the drive train extending to the distribution gear mechanism for pumps. The driving speed of the generator can be selected with a view to an optimum electric power output, and, in particular, within a wide range independent from e.g. the nominal speed of the combustion engine (about 1700 to 2300 revs/minute). In this fashion the combustion engine is operating with a speed which is optimal with a view to the energy balance of the combustion engine. Furthermore, e.g. pumps of the functional groups are driven in optimised fashion via the distribution gear mechanism for pumps.

In an expedient embodiment the generator is using the, or at least a part of the, mounting space in the casing for the flywheel and/or clutch, which mounting space until now has not been utilised. The casing, preferably, is a standardised casing and as such available for fair cost. The used mounting space is available in the annular space between the relatively large casing and the elastic rotary clutch having relatively small dimensions. In this fashion mounting space for arranging the generator is saved in the road paver which saved mounting space may be used for installing other functional groups.

In an expedient embodiment the drive train extends to the power branching distribution gear mechanism for pumps which is mounted at the combustion engine downstream of the generator. The distribution gear mechanism for pumps drives further functional groups either parallel to the generator or with a lower ranking than the generator. The directly or indirectly mounted distribution gear mechanism for pumps results in a compact primary drive aggregate even with the integrated generator.

In an alternative solution either a stator ring or an intermediate casing containing the stator ring of the generator may be directly mounted at the engine block between the combustion engine and the distribution gear mechanism for pumps. In this case the generator so to speak replaces, at least partially, the casing for the clutch and/or the flywheel and serves as a carrier of the distribution gear mechanism for pumps.

In an expedient embodiment the rotor is permanently connected either to the crankshaft or to the drive train such that the generator is permanently driven when the combustion engine is operating. The rotor defines a moment of inertia due to the mass allowing to either provide only a small flywheel or dispense with a flywheel.

In a further embodiment at least one planetary gear stage is functionally associated to the generator facilitating to operate the generator and the combustion engine with respective optimal speeds. The planetary gear stage is compact, can be at least partially arranged in the mounting space which is readily available and does not generate undesirable lateral forces in the drive train.

In a further embodiment a switchable clutch is arranged between the crankshaft or the drive train and the rotor of the generator and/or the distribution gear mechanism for pumps. The switchable clutch facilitates to separate the generator and/or the distribution gear mechanism for pumps from the combustion engine. The clutch, when disengaged e.g. allows to reduce the drag load for the combustion engine during engine start, in particular in case of extreme weather conditions and/or during transport travel, and improves the starting performance of the combustion engine. Even the planetary gear stage, if provided, can be separated or disengaged from the crankshaft of the combustion engine. Expediently, the switchable clutch, which, in particular, serves to separate the planetary gear stage and the distribution gear mechanism for pumps from the drive train, is arranged either in the planetary gear stage or in the distribution gear mechanism for pumps in order to contribute to a compact structure of the primary drive aggregate, and also to allow to support, cool, and supply the switchable clutch by using available possibilities.

In a further, expedient embodiment the switchable clutch functionally is arranged between the drive train and an input shaft of the distribution gear mechanism for pumps as well as of the planetary gear stage. In this case the drive train may extend to a travelling drive pump aggregate carried e.g. by the distribution gear mechanism for pumps. When disengaged, the switchable clutch separates the planetary gear stage and/or the input shaft of the distribution gear mechanism for pumps while the travelling drive pump aggregate still remains driven. This condition e.g. corresponds to an operation of the road paver for transport travel, when maximum output power of the combustion is needed for high transport travel speed. During transport travel the not driven functional groups supplied with power from the distribution gear mechanism for pumps and, in some cases, even the generator for operating heating devices are not needed. In such operation condition the fuel consumption will then be markedly reduced.

As additional heat may be generated owing to high electric power taken from the generator and owing to relatively high rotational speeds an expedient embodiment is equipped with a cooling system at least for the generator, preferably also for the planetary gear stage. The cooling system takes up heat which is generated in this region of the primary drive aggregate which heat can hardly be transported away in normal fashion. This allows an optimal operation of the powerful ring generator.

In a structurally simple embodiment at least one cooling fan wheel is arranged at the rotor. In this case the ring rotor runs dry and is cooled in this region by cooling air.

Alternatively, even a liquid cooling system may be provided which, preferably, comprises at least one cooling circuit extending through the distribution gear mechanism for pumps and operating e.g. with the transmission oil or another heat carrier. The distribution gear mechanism for pumps contains a markedly large oil volume and efficiently transports heat contained in the oil to the exterior. For that reason the distribution gear mechanism for pumps can be used without complicated external cooling equipment for cooling the ring generator and the planetary gear stage of the ring generator, although, in some cases, even an additional external oil cooler could be provided.

In a structurally simple embodiment the rotor, in particular the hollow ring rotor of the ring generator, is flanged onto a clutch hub on the output side of the elastic rotary clutch. An input shaft of the drive train is coupled with the clutch hub. The drive train extends through the rotor, e.g. the hollow ring rotor, and drives further function groups like e.g. the distribution gear mechanism for pumps and/or travelling drive pump aggregates. The elastic rotary clutch to a large extent prevents or dampens influences resulting from the operation of the drive train and/or the generator for the combustion engine or the flywheel of the combustion engine, respectively.

The inner diameter of the hollow ring rotor of the ring generator may broadly correspond to the outer diameter of the flywheel of the combustion engine, if a flywheel is provided. Owing to the relatively large diameter of the ring generator, a high relative speed results between the ring rotor and the stator ring. This assures an optimal power gain or an optimal high electric power output.

In a further embodiment an additional generator may be driven from the distribution gear mechanism for pumps via a belt drive or a universal joint cardan shaft. The additional generator, so to speak, is an auxiliary generator for secondary functional groups, or in the case that the main generator is disengaged via the switchable clutch. The main generator e.g. may be supported at the distribution gear mechanism for pumps so that the generator does not load the crankshaft of the combustion engine with undesirable lateral forces. The main generator may even be suspended in the chassis of the road paver. For the auxiliary generator an optimal place can be selected within the road paver because thanks to the belt drive or a universal joint cardan shaft the auxiliary generator can be placed offset in relation to the primary drive aggregate.

Figure 2:
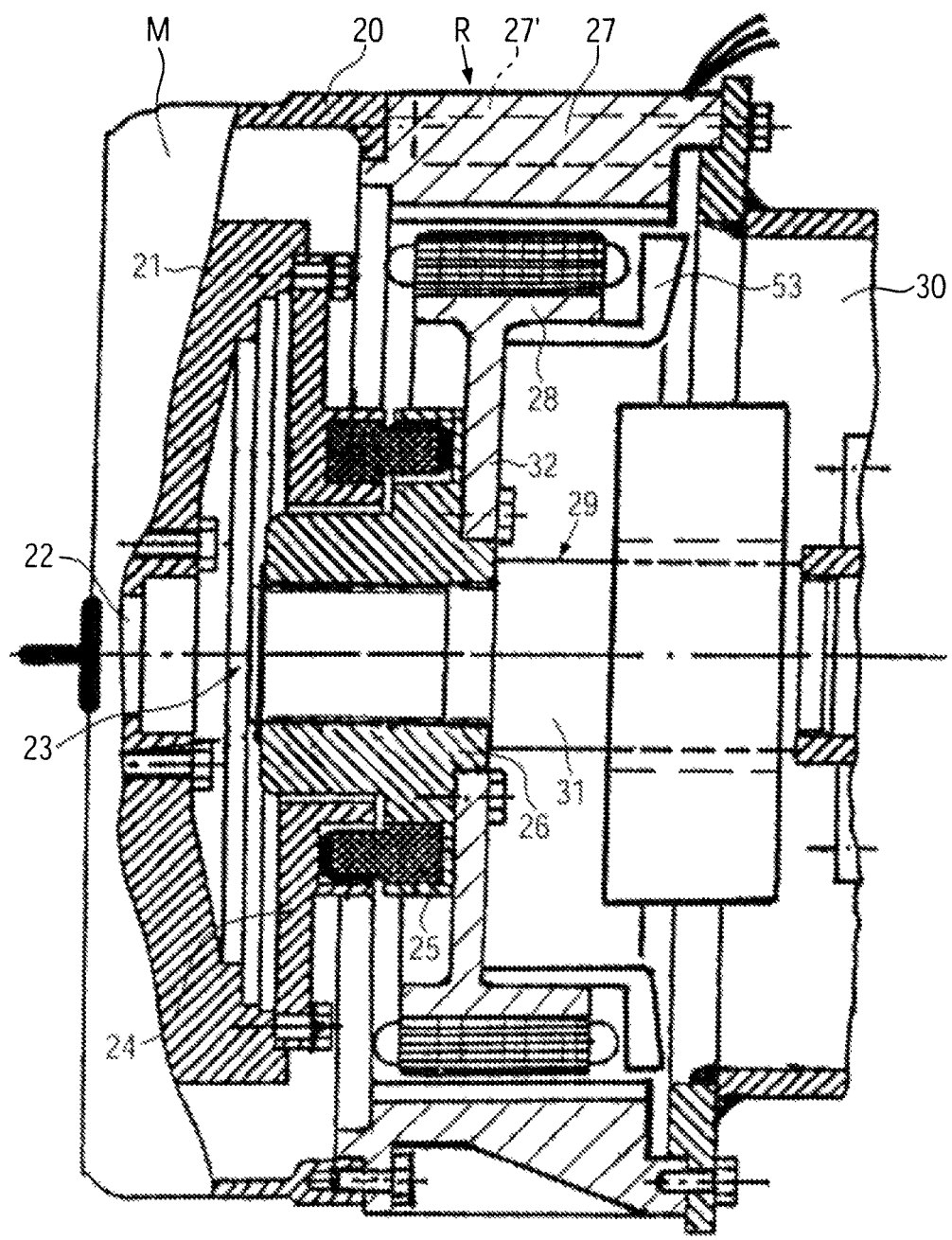
Figure 3:
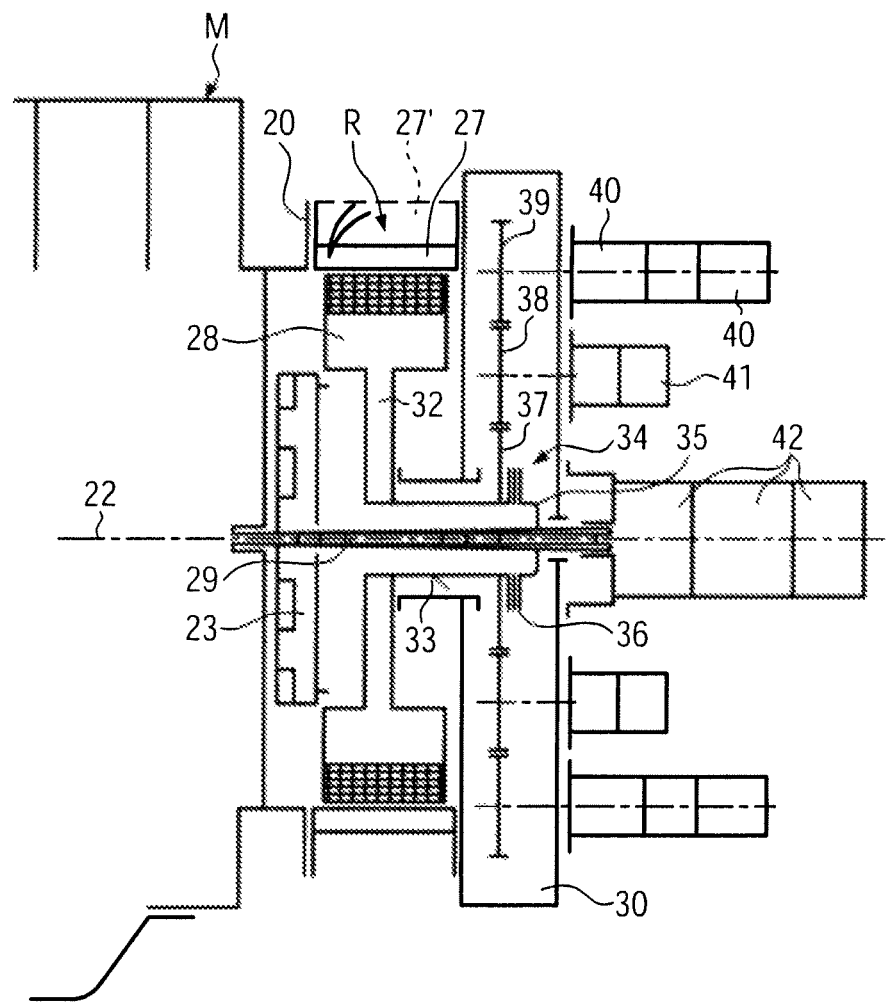
Figure 4:
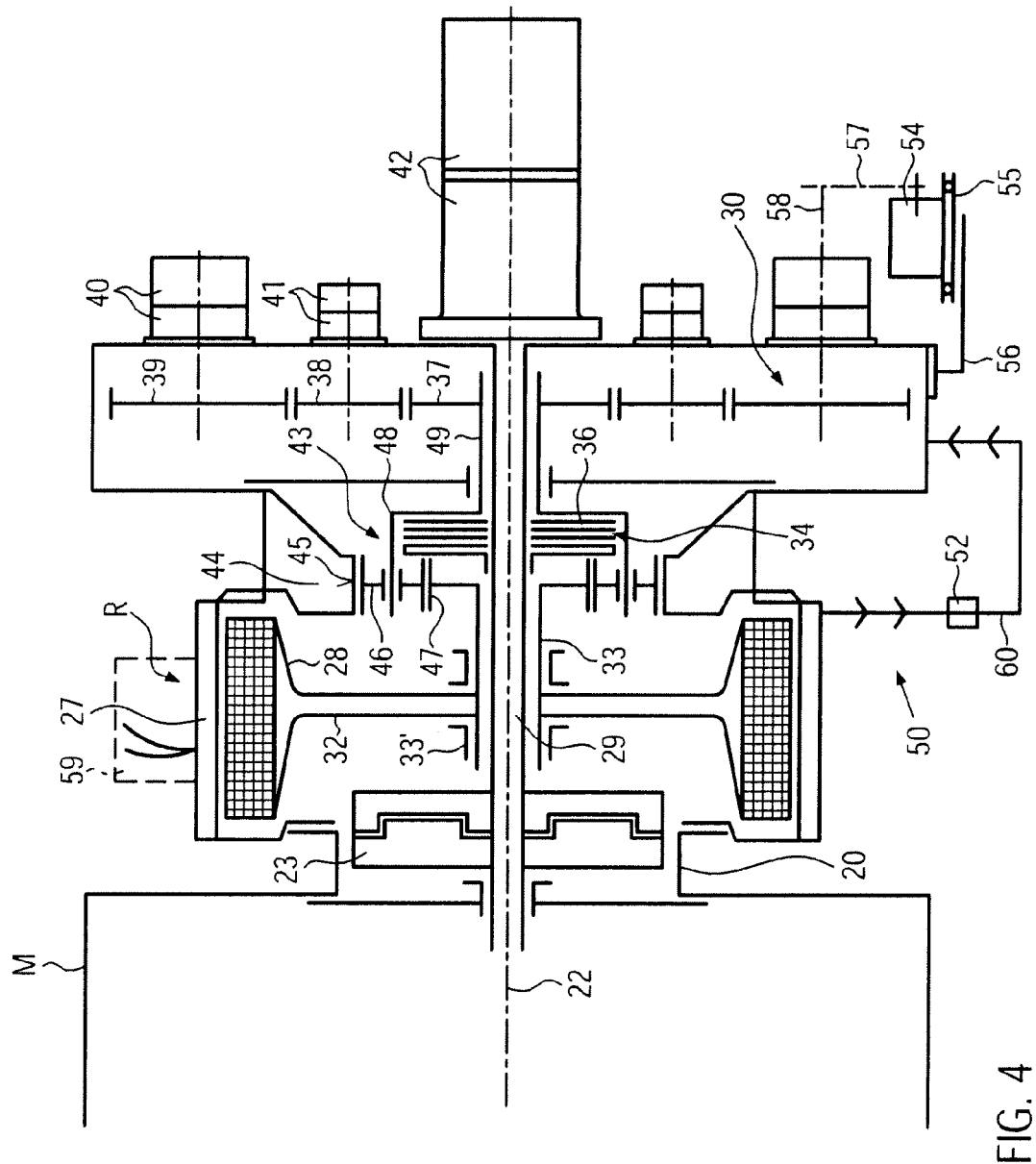

Embodiments of the invention will be explained with the help of the drawing. In the drawing is:

FIG. 1 a schematic side view of a road paver,

FIG. 2 a part of an axial section illustrating the integration of a generator directly in the power output region of the crankshaft of a combustion engine, FIG. 3 a schematic illustration of a further embodiment, and FIG. 4 a schematic illustration of a further embodiment.

A road paver F shown in FIG. 1 comprises a travelling undercarriage 2 at a chassis 1, in this case a caterpillar travelling device, with at least one e.g. hydraulically driven wheel 16. An operator's platform 3 is arranged on the chassis 1. In front of the operator's platform a primary driving source or primary driving aggregate P is arranged on the chassis 1, e.g. a combustion engine M, like a diesel engine, with an integrated generator R and a distribution gear mechanism 30 for pumps. The primary driving aggregate P in the chassis 1 is accessible for maintenance purposes via side flaps and a top hood 4.

In working travelling direction of the road paver F in FIG. 1 (from the right side to the left side) a hopper 5 for paving material is arranged in front of the primary driving aggregate P in the chassis 1. A longitudinal conveying device 6 which e.g. is driven hydraulically, extends from the hopper 5 within the chassis 1 to a lateral distribution device 7 which is arranged behind the chassis 1. The lateral distribution device 7 typically is a lateral distribution auger. Towing bars 8 are linked to the chassis at both sides 1. A paving screed B is mounted in the rear to the towing bars 8. The paving screed B e.g. consists of a base screed 12 and of extension screed parts 13 which are adjustable in guiding systems 9 at the base screed 12. Furthermore, electric heating devices H, e.g. for pressing bars or tamper bars 10, 11 and sole plates, are contained in the paving screed B. During transport travel of the road paver F the paving screed B may be supported by cylinders 14 at the chassis 1 in the shown elevated transport position. Cylinders 15, furthermore, serve for adjusting the linking points of both towing bars 8 in height direction. Hydraulic cylinders 17 situated at the front constitute hydraulic consumers or functional structural groups and e.g. to adjust side walls of the hopper 5. An operator console 51 is arranged in the operator's platform 3 allowing to control and monitor all of the functional structural groups and also the primary driving aggregate P.

According to FIG. 2 the combustion engine M comprising an engine block with a casing 20 for a clutch and/or a flywheel which casing 20 may be a standardised casing 20 (e.g. according to SAE regulations). The casing 20 surrounds a power output region of crankshaft 22 of the combustion engine M. A flywheel 21 is arranged on the crankshaft 22. A elastic rotary clutch 23 is connected to the flywheel 21 within the casing 20. A clutch hub 24 is attached at the flywheel 21 via threaded connections. The clutch hub 24 drives a second clutch hub 26 via elastic elements 25. An input shaft 31 of a drive train 29 is e.g. inserted into the second clutch hub 26 such that the input shaft 31 rotates with the second clutch hub 26. The drive train 21 extends to the distribution gear mechanism 30 for pumps. The generator R is inserted between the casing 20 containing the clutch and/or the flywheel and the distribution gear mechanism 30 for pumps. The generator R comprises a stator ring 27 which is directly flanged to an end flange of the casing 20 for the clutch and/or the flywheel. The stator ring 27 partially engages into the interior space of the casing 20. A mounting flange of the distribution gear mechanism 30 for pumps is mounted at the generator R. The generator R, so to speak, is installed in sandwich fashion between the distribution gear mechanism 30 for pumps and the combustion engine M such that it partially engages into the casing 20. Optionally, the stator ring 27 may be arranged in a stator ring intermediate casing 27' which is not shown in detail. In a not shown alternative embodiment the generator R is mounted, at least to a significant extent, in the casing 20.

In a not shown alternative embodiment the generator R may even be flanged directly to the engine block of the combustion engine M in order to, so to speak, replace the casing 20 for the flywheel and/or the clutch.

Expediently, the generator R is a ring generator R with permanent magnet excitation. The generator R contains within the stator ring 27 a rotor 28 which is formed as a hollow ring rotor the diameter of which substantially may correspond to the diameter of the flywheel 21.

The rotor 28 is fixed with web 32 by threaded connections to the clutch hub 26, and in this case runs dry, and may carry a cooling fan wheel 53 for cooling purposes.

In the embodiment in FIG. 3 the generator R being a ring generator is installed directly at the combustion engine M between the casing 20 for the clutch and/or the flywheel and the distribution gear mechanism 30 for pumps. The crankshaft 22 is connected to the drive train 29 via the elastic rotary clutch 23. The drive train 22 extends through the rotor 28 into the distribution gear mechanism 30 for pumps and further through the distribution gear mechanism 30 for pumps to a travelling pump aggregate 42 which centrally is flanged to the gear box of the distribution gear mechanism 30 for pumps. In this case, preferably, the travelling pump aggregate 42 is permanently driven by the drive train 29.

First, second and third gear wheel stages 37, 38, 39 are contained in the distribution gear mechanism 30 for pumps. The central gear wheel stage 37 is driven by a hollow shaft 33 on which also the web 32 of the rotor 28 of the generator R is arranged such that the rotor 8 rotates with the hollow shaft 33.

A switchable clutch 34 may be arranged on the drive train 29 within the distribution gear mechanism 30 for pumps. The switchable clutch 34, when disengaged, separates the hollow shaft 33 from the drive train 29 such that then the gear wheel stages 37, 38, 39 within the distribution gear mechanism 30 for pumps and also the generator R will not run while the combustion engine M is operating, e.g. for transport travel, while the travelling pump aggregate 42 is still driven. Optionally, even the generator R then may be driven permanently, i.e. cannot be separated by the switchable clutch 34.

Hydraulic pumps 40, 41 for hydraulic working functional units or functional groups of the road paver and/or of the paving screed B e.g. may be arranged at and connected to several power branches of the distribution gear mechanism 30 for pumps. The hydraulic working functional units or working functional groups respectively can be driven by the distribution gear mechanism 30 for pumps. The generator R formed as a ring generator is inserted, optionally at least partly, in the casing 20 for the clutch and/or the flywheel within the mounting space available in diameter direction around the rotation elastic clutch 23 and sandwich-like between the distribution gear mechanism 30 for pumps and the casing 20 for the clutch and/or the flywheel. The generator R, optionally, may be inserted with a stator ring intermediate casing 27'. In some cases the stator ring intermediate casing 27 even may replace the casing 20.

The switchable clutch 34 comprises a clutch part 35 coupled with the drive train 29 such that the clutch part 35 rotates with the drive train 29, and a switching element 36, e.g. several hydraulically actuated clutch discs. In engaged condition of the switchable clutch 34 the hollow shaft 33 is driven such that also the rotor 28 of the generator R and the gear wheel stages 37, 38, 39 of the distribution gear mechanisms 30 for pumps are driven.

It would be possible to alternatively either also separate via the switchable clutch 34 the travelling pump aggregate 42 (several pump stages), or to provide a further switchable clutch (not shown) for only selectively separating the travelling pump aggregate 42.

In the case of a hydraulically actuated switchable clutch 34 a pressure accumulator and/or a permanently driven auxiliary pump may be provided in the hydraulic system of the road paver in order to assure that the necessary switching pressure for engaging the clutch 34 will be available when the switchable clutch 34 is disengaged and when the other pumps are separated.

The embodiment shown in FIG. 4 has a similar arrangement to the embodiment of FIG. 3, however, differs from the embodiment of FIG. 3 in that at least one planetary gear stage 43 is provided between the drive train 29 and the rotor 28. The planetary gear stage 43, preferably, is a provided either in combination with the switchable clutch 34 or without a switchable clutch 34. The purpose of the planetary gear stage 43 is to drive the rotor 28 with optimal speed and optimal relative speed in relation to the stator ring 27, e.g. to gear up or throttle down, the speed of the rotor 28 when the combustion engine M operates with nominal speed.

The planetary gear stage 43 either is arranged partly in the interior of the generator R or via an intermediate housing 44 between the generator R and the distribution gear mechanism 30 for pumps, or even, optionally, within the distribution gear mechanism 30 for pumps. In case that the intermediate housing 44 is provided, the intermediate housing 44 has an inner ring gear 45 meshing with several planetary wheels 46 each being rotationally supported on a planetary wheel carrier 48. The planetary gear carrier 48, in this embodiment, drives via a hollow shaft 49 supported in the distribution gear mechanism 30 for pumps the gear wheel stages 37, 38, 39 of the distribution gear mechanism 30 for pumps. Preferably, the drive train 29 extends further and directly through the distribution gear mechanism 30 for pumps to the travelling pump aggregate 42 such that the travelling pump aggregate 42 is permanently driven. The planetary wheels 46 on the planetary wheel carrier 48 mesh with an inner gearing 47 of a gear wheel on the hollow shaft 33 which is firmly connected with the web 32 of the ring rotor 28 and which e.g. is supported in bearings at a location 33'. The switchable clutch 34, preferably, is installed in the planetary gear carrier 48 to selectively couple the planetary gear carrier 48 and the hollow shaft 49 with the drive train 29 or to separate them from the drive train 29. Optionally, only the hollow shaft 49 can be separated via the switchable clutch.

In order to efficiently remove heat generated in the generator R, and, in some cases, by the planetary wheel stage 43, a liquid cooling system 50 is provided comprising a circuit 60, e.g. containing transmission oil, the circuit 60 extending through the distribution gear mechanism 30 for pumps. Optionally, even a circulation pump (not shown) for the transmission oil may be integrated here. As an additional option, alternatively or additively, a separate oil cooler 52 may be arranged in the circuit 60. Even another heat carrier could be used instead of the transmission oil for the cooling system.

Furthermore, and as optional equipment, an auxiliary generator 54 may be provided in a suspension 56 at the distribution gear mechanism 30 for pumps (alternatively, the auxiliary generator 45 may be supported separately at a separate suspension 55 in the chassis 1 of the road paver F and structurally separated from the distribution gear mechanism 30 for pumps). The auxiliary generator 54, e.g., is driven from a power output 58 of the distribution gear mechanism 30 for pumps via a belt drive or a universal cardan joint 57, e.g. permanently.

The generator R among others is provided to cover high electric power demand of various electric heating devices H in the road paver F, e.g. within the paving screed B and/or also in the region of the longitudinal conveying device 6 in the chassis 1.

The generator R may, in order to improve the starting performance of the combustion engine M, be separated via the switchable clutch 34 for the start and during a warm-up phase of the combustion engine M. However, it would also be possible to only separate the distribution gear mechanism 30 for pumps and to permanently drive the generator R then, in order to already electrically power the heating devices H to operation temperature after the start and to avoid to then overcome the drag resistance of the distribution gear mechanism 30 for pumps and of the function unit groups connected to the distribution gear mechanism 30 for pumps. Furthermore, it is possible during transport travel of the road paver to separate the generator R and/or the distribution gear mechanism 30 for pumps by means of the switchable clutch 34, since during transport travel normally heating devices H need not to be operated and functional structural groups need not to be controlled. Then only the travelling pump aggregate 42 is driven in order to propel the road paver with optimal high transport travelling speed and/or operate the combustion engine with optimised fuel consumption.

If the at least one planetary wheel stage 43 is designed correspondingly it allows to drive the generator R with optimal speed. In order to arrange the generator R in space saving fashion it may in some cases only be necessary in comparison to conventional structural concepts to somewhat prolong an existing main shaft of the distribution gear mechanism 30 for pumps or the drive train 29 corresponding to the axial dimension of the generator R to then place the generator R accordingly. An electric or electronic control device with frequency converters or inverters may either directly be mounted at the generator R or at a suitable location within the road paver F. The distribution gear mechanism 30 for pumps or the gear stages 37, 38, 39 of the distribution gear mechanism 30 for pumps as well may be driven with optimal speeds or speed ratios largely independent from the speed which is optimal for the operation of the generator R. Expediently, the generator R is a compact, powerful ring generator with permanent magnet excitation and a hollow ring rotor. The generator R is arranged such at the combustion engine M that it extends at least substantially coaxial to the crankshaft 22 and such that it is penetrated by the drive train 29 extending to the distribution gear mechanism 30 for pumps.

The invention claimed is:
1. A road paver comprising
   a combustion engine having an engine block and a crankshaft terminating in a flywheel in a power output region of the engine,
   at least one ring generator comprising a stator ring and a hollow ring rotor within the stator ring, the generator being driven by the engine in the power output region and being at least partially mounted in a ring space in the power output region,
   a plurality of electric heating devices on the road paver supplied with electric power from the generator, and a drive train connected to the power output region, the drive train extending through the hollow rotor and driving a distribution gear mechanism that drives a plurality of hydraulic pumps.

2. The road paver of claim 1 wherein the engine block comprises at least one of the stator ring or the stator casing.

3. Road paver as in claim 1, wherein the generator has magnetic excitation and the drive train extends through the hollow ring rotor and wherein an elastic rotary clutch is connected to the flywheel.

4. Road paver as in claim 1, wherein the distribution gear mechanism for pumps is mounted at the side of the generator remote from the combustion engine, at the generator, or at a casing for a clutch, and/or flywheel, which casing contains the generator.

5. Road paver as in claim 1, wherein the stator ring or an intermediate casing of the generator containing the stator ring is located between the engine block of the combustion engine and the distribution gear mechanism for pumps.

6. Road paver as in claim 1, wherein at least one planetary gear stage is arranged between the rotor of the generator and either the power output region or the drive train, at least partially within an intermediate casing positioned between the generator and the distribution gear mechanism for pumps.

7. Road paver as in claim 6, wherein a switchable clutch is located in the planetary gear stage or in the distribution gear mechanism for pumps.

8. Road paver as in claim 7, wherein the switchable clutch positioned between the drive train and drives a travelling drive pump aggregate located at the distribution gear mechanism for pumps and a planetary wheel gear stage and/or an input shaft of the distribution gear mechanism for pumps.

9. Road paver as in claim 1, wherein a switchable clutch is located between the power output region and the rotor and/or the drive train within the drive train.

10. Road paver as in claim 1, including a cooling system for the ring generator and a planetary gear stage.

11. Road paver as in claim 10, wherein the ring rotor of the ring generator runs dry and is connected with at least a cooling fan wheel.

12. Road paver as in claim 10, wherein the cooling system is a liquid cooling system, and includes a cooling circuit extended through the distribution gear mechanism for pumps.

13. Road paver as in claim 1, wherein the rotor is flanged onto a downstream side clutch hub of an elastic rotary clutch arranged at the power output region, and an input shaft of the drive train is coupled with a hub for the clutch.

14. A road paver comprising a combustion engine,
a crankshaft of the engine ending with a flywheel in a power output region,
at least one ring generator having a permanent magnet, a stator ring mounted to a generator casing, and a hollow ring rotor within the stator ring and
at least one pump distribution gear mechanism,
the generator being connected to the combustion engine substantially coaxial to the crankshaft of the engine at least for supplying electric power to at least a plurality of electric heating devices on the road paver and/or in a paving screed of the road paver,
the pump distribution gear mechanism being attached to the stator ring at an axial side of the stator ring remote from the combustion engine,
an elastic rotary clutch located at the power output of the engine and in the casing connected to the flywheel and comprising an upstream side clutch hub and a downstream side clutch hub, the downstream side clutch hub being driven by the upstream side clutch hub,
a drive train structurally separated from the hollow ring rotor and connected to the downstream side clutch hub extending through the hollow ring rotor to the distribution gear mechanism for pumps, and
the hollow ring rotor being connected to the downstream side clutch hub and being driven by the drive train via at least one planetary gear stage.

15. The road paver as defined in claim 14, wherein the at least one planetary gear stage is arranged partly in the interior of the ring generator, between the ring generator and the distribution gear mechanism for pumps, or within the distribution gear mechanism.

\* \* \* \* \*